(12) United States Patent
Kriz et al.

(10) Patent No.: US 12,539,318 B1
(45) Date of Patent: Feb. 3, 2026

(54) NON-CALORIC PROBIOTIC COMPOSITION AND METHOD OF PREPARATION

(71) Applicant: K & K Ventures, LLC, Cheyenne, WY (US)

(72) Inventors: Dale M. Kriz, Phoenix, AZ (US); Kiran Krishnan, Bolingbrook, IL (US)

(73) Assignee: K & K Ventures, LLC, Cheyenne, WY (US)

( * ) Notice: Subject to any disclaimer, the term of this patent is extended or adjusted under 35 U.S.C. 154(b) by 372 days.

(21) Appl. No.: 16/258,555

(22) Filed: Jan. 26, 2019

Related U.S. Application Data

(63) Continuation of application No. 14/562,032, filed on Dec. 5, 2014, now abandoned.

(60) Provisional application No. 61/913,228, filed on Dec. 6, 2013.

(51) Int. Cl.
| | | |
|---|---|---|
| *A61K 35/747* | (2015.01) | |
| *A23L 2/52* | (2006.01) | |
| *A23L 33/135* | (2016.01) | |
| *A61K 35/742* | (2015.01) | |
| *A61K 35/744* | (2015.01) | |
| *A61K 35/745* | (2015.01) | |
| *A61K 36/064* | (2006.01) | |
| *A61K 35/00* | (2006.01) | |

(52) U.S. Cl.
CPC .............. *A61K 35/747* (2013.01); *A23L 2/52* (2013.01); *A23L 33/135* (2016.08); *A61K 35/742* (2013.01); *A61K 35/744* (2013.01); *A61K 35/745* (2013.01); *A61K 36/064* (2013.01); *A61K 2035/115* (2013.01)

(58) Field of Classification Search
None
See application file for complete search history.

(56) References Cited

U.S. PATENT DOCUMENTS

| | | | |
|---|---|---|---|
| 2012/0251512 A1* | 10/2012 | Farmer | A23K 50/20 424/93.46 |
| 2013/0224303 A1* | 8/2013 | Nag | C12N 1/04 424/490 |

OTHER PUBLICATIONS

Ding et al., International food research journal vol. 15, No. 2, pp. 219-232, 2008 (Year: 2008).*

* cited by examiner

*Primary Examiner* — Gary B Nickol
*Assistant Examiner* — Khatol S Shahnan Shah
(74) *Attorney, Agent, or Firm* — Michelle L. Gross, P.C.

(57) ABSTRACT

A probiotic composition comprising at least one viable probiotic microorganism having a biological or therapeutic activity in the gastrointestinal tract and a carrier suitable for human consumption is disclosed. The probiotic composition may contain drinking water and electrolytes and the probiotic microorganism may be spores of a probiotic microorganism. Also provided are methods of treating acute or chronic diarrhea and of improving immune function, digestive health, and/or intestinal flora by administering the probiotic composition. In addition, a food additive comprising at least one viable probiotic microorganism having a biological or therapeutic activity in the gastrointestinal tract and a carrier suitable for human consumption is provided.

10 Claims, 1 Drawing Sheet

NON-CALORIC PROBIOTIC COMPOSITION AND METHOD OF PREPARATION

CROSS REFERENCE TO RELATED APPLICATIONS

This document is a continuation of U.S. application Ser. No. 14/562,032 entitled "NON-CALORIC PROBIOTIC COMPOSITION AND METHOD OF PREPARATION" to Kriz which was filed on Dec. 5, 2014 and claims the benefit of the filing date of U.S. Provisional Patent Application 61/913,228 entitled "DELIVERY OF LIVE PROBIOTIC CULTURES IN NON-CALORIC HYDRATING WATER" to Kriz which was filed on Dec. 6, 2013, the contents of which are hereby incorporated by reference.

BACKGROUND

Technical Field

The present disclosure relates to the field of probiotic compositions.

Background Art

Probiotic microorganisms are live microbial preparations that may be administered to a subject in order to confer a beneficial effect, such as restoring or improving the composition of intestinal microflora. Probiotics are typically provided as dietary supplements containing potentially beneficial bacteria or yeast and are widely consumed in foods as well as in capsules and powders (Stanton et al, Market potential of probiotics. Am J Clin Nutr 73 (suppl):476S-83S.). Generally, lactic acid bacteria including *Lactobacillus* and *Bifidobacterium* are used as probiotics but other genera are also used including *Lactococcus, Propionibacterium, Bacillus, Saccharomyces* as well as strains of *Escherichia*. Within these genera, many species and strains have been reported to have probiotic properties. The most common vehicles for the delivery of probiotics are dairy products and probiotic fortified foods. However, powders, tablets and capsules containing probiotics are also available.

Probiotic beverages currently manufactured and available are generally either dairy based, juice based, or ferment based. These beverages typically contain sugars, flavoring agents, processing aids, preservatives, and other compounds used to stabilize the product. Probiotic beverages are often flavored and require refrigerated delivery, storage, and use. Liquid is preferred method of delivering daily probiotics as a liquid medium allows for better absorption of the probiotics and better distribution across the gastrointestinal tract. In addition, a liquid medium is convenient and doesn't require swallowing of pills or tablets and has the duel function of hydration or thirst quenching. However, since current probiotic beverages generally contain flavoring compounds and calories (typically from sugar), it creates a health paradox where the beneficial bacteria are required and useful, but the delivery system is unhealthy. It is desirable to have a probiotic beverage that allows for delivery of effective levels of live probiotic cultures without additives (e.g., sugars and flavoring agents) and is suitable for all age groups and dietary habits.

Probiotics beneficially affect the host by supporting naturally occurring gut flora, by competing with harmful microorganisms in the gastrointestinal tract, by assisting useful metabolic processes, and by strengthening the resistance of the host organism against toxic substances. Several microorganisms are used in probiotic foods including the bacterial genera *Lactobacillus, Bifidobacterium, Lactococcus, Propionibacterium, Bacillus, Enterococcus, Escherichia*, and *Streptococcus*. The different strains of bacteria and yeast vary in the probiotic benefits they can provide. However, a common problem for all probiotics is that of survival during processing and storage since it is well reported that the microbes must be alive to be active and confer the maximum beneficial effect.

SUMMARY

The present disclosure provides a convenient, effective and stable delivery method for daily probiotics without the need to consume additional calories, flavoring compounds, preservatives, dairy, stabilizers, emulsifiers or other processing aids.

According to one aspect, a probiotic drink comprises at least one viable probiotic microorganism and water. The at least one probiotic microorganism comprises one or more of microencapsulated viable probiotic microorganisms and spores of *Bacillus* sp.

Various implementations and embodiments may comprise one or more of the following. The probiotic drink may be devoid of flavor masking agents, sugars, calories and artificial sweeteners. The probiotic drink may further comprise a carrier suitable for human consumption. The at least one viable probiotic microorganism may comprise microencapsulated viable probiotic organisms selected from the group consisting of *Lactobacillus* sp., *Bifidobacterium* sp., *Lactococcus* sp., *Propionibacterium* sp., *Bacillus* sp., *Enterococcus* sp., *Escherichia* sp., *Streptococcus* sp., *Pediococcus* sp., and *Saccharomyces* sp. The microencapsulated viable probiotic organisms may be microencapsulated through one or more of pan coating, air-suspension coating, centrifugal extrusion, vibrational nozzle, spray-drying, ionotropic gelation, interfacial polycondensation, interfacial cross-linking, in situ polymerization, and matrix polymerization. The at least one viable probiotic microorganism may comprise the spores of *Bacillus* sp. Concentration of the spores of *Bacillus* sp. may be between about $3\times10^6$ CFU/mL and about $7\times10^6$ CFU/mL of the probiotic drink. The probiotic drink may further comprise electrolytes. The carrier may be selected from the group consisting of Gum Acacia, ascorbyl palmitate, TWEEN® 80 (polyethylene glycol sorbitan monooleate), Span® 40 (sorbitan monopalmitate), anhydrous glucose, anhydrous dextrose, dextrose monohydrate, and combinations thereof.

According to another aspect, a probiotic composition for use as a food or drink additive comprises a therapeutically effective amount of spores of *Bacillus* sp., and a carrier suitable for human consumption. The carrier is selected from the group consisting of Gum Acacia, ascorbyl palmitate, TWEEN® 80 (polyethylene glycol sorbitan monooleate), Span® 40 (sorbitan monopalmitate), anhydrous glucose, anhydrous dextrose, dextrose monohydrate, and combinations thereof. The probiotic composition is devoid of flavor masking agents, sugars, calories and artificial sweeteners Various implementations and embodiments may comprise one or more of the following. The carrier may be a combination of Gum Acacia, ascorbyl palmitate, TWEEN® 80 (polyethylene glycol sorbitan monooleate), and Span® 40 (sorbitan monopalmitate). The spores of *Bacillus* sp. are selected from the group consisting of *Bacillus subtilis, Bacillus coagulans*, and *Bacillus* lichenformis. The composition may further comprise electrolytes.

According to another aspect, a method of supplementing drinking water, comprises mixing at least one viable probiotic microorganism with a carrier suitable for human consumption, the at least one probiotic microorganism comprising one or more of microencapsulated viable probiotic microorganisms and spores of *Bacillus* sp., and mixing the at least one viable probiotic microorganism and carrier with drinking water.

Various implementations and embodiments may comprise one or more of the following. Mixing the at least one viable probiotic microorganism and carrier with drinking water may comprise: mixing the at least one viable probiotic with a first volume of drinking water to form a first dilution; mixing the first dilution with a second volume of drinking water to form a second dilution, the second volume of drinking water being between about five and about fifteen times greater than the first volume of drinking water; and mixing the second dilution with a third volume of drinking water to form a third dilution having a concentration of the at least one viable probiotic microorganism substantially equal to a predetermined concentration of the at least one viable probiotic microorganism in the probiotic drink, wherein the third volume of drinking water is between about five and about fifteen times greater than the first volume of drinking water. The at least one viable probiotic microorganism may comprise spores of *Bacillus* sp. The at least one viable probiotic microorganism may comprise microencapsulated viable probiotic microorganisms. The second volume of drinking water may be between about eight and about ten times greater than the first volume of drinking water, and wherein the third volume of drinking water is between about eight and about ten times greater than the second volume of drinking water. The concentration of the at least one viable probiotic microorganism in the third dilution may be between about $3 \times 10^6$ CFU/mL and about $6 \times 10^6$ CFU/mL. The method may further comprise drying the mixture of the at least one viable probiotic microorganism and the carrier to form a desiccated powder that is soluble in water.

According to another aspect, a method of improving immune function, digestive health, and intestinal flora in a subject comprises determining a subject in need of improved immune function, digestive health, and intestinal flora; and administering to the subject therapeutically effective amount of a probiotic composition comprising at least one viable probiotic microorganism and a carrier suitable for human consumption, the at least one probiotic microorganism comprising one or more of microencapsulated viable probiotic microorganisms and spores of *Bacillus* sp.

Various implementations and embodiments may comprise one or more of the following. The probiotic composition may further comprise drinking water. The at least one viable probiotic microorganism may comprise spores of *Bacillus* sp. and the probiotic composition is devoid of flavor masking agents, sugars, calories and artificial sweeteners. The carrier may be selected from the group consisting of Gum Acacia, ascorbyl palmitate, TWEEN® 80 (polyethylene glycol sorbitan monooleate), Span® 40 (sorbitan monopalmitate), anhydrous glucose, anhydrous dextrose, dextrose monohydrate, and combinations thereof.

DETAILED DESCRIPTION

Figure 1:
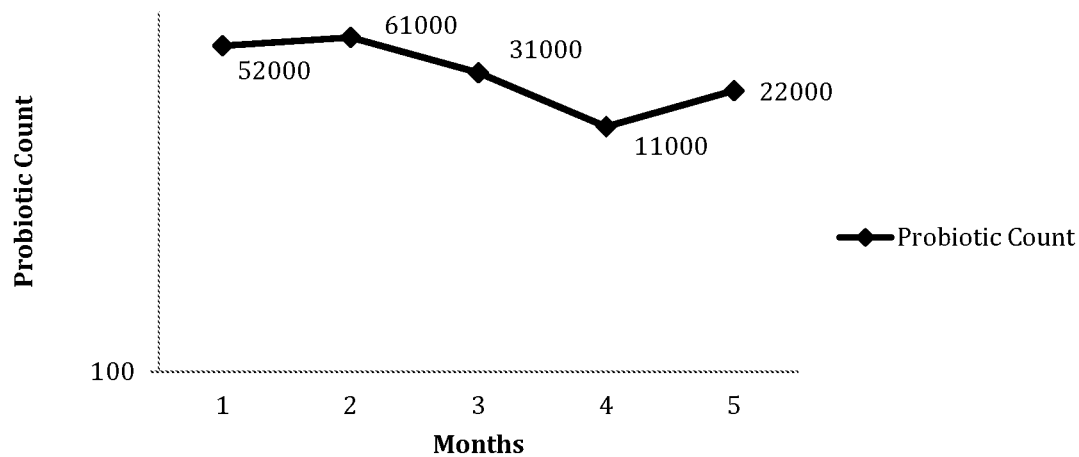
FIG. 1 depicts a graph representing stability testing of a probiotic strain in filtered water formulated as described herein over a 6-month period.

As used herein, the verb "comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one".

As used herein, an "effective amount" or an "amount effective for" is defined as an amount effective, at dosages and for periods of time necessary, to achieve a desired biological result, such as reducing, preventing, or treating a disease or condition and/or inducing a particular beneficial effect. The effective amount of compositions of the disclosure may vary according to factors such as age, sex, and weight of the individual. Dosage regime may be adjusted to provide the optimum response. Several divided doses may be administered daily, or the dose may be proportionally reduced as indicated by the exigencies of an individual's situation. As will be readily appreciated, a composition in accordance with the present disclosure may be administered in a single serving or in multiple servings spaced throughout the day. As will be understood by those skilled in the art, servings need not be limited to daily administration, and may be on an every second or third day or other convenient effective basis. The administration on a given day may be in a single serving or in multiple servings spaced throughout the day depending on the exigencies of the situation.

As used herein, the term "subject" or "patient" refers to any vertebrate including, without limitation, humans and other primates (e.g., chimpanzees and other apes and monkey species), farm animals (e.g., cattle, sheep, pigs, goats and horses), domestic mammals (e.g., dogs and cats), laboratory animals (e.g., rodents such as mice, rats, and guinea pigs), and birds (e.g., domestic, wild and game birds such as chickens, turkeys and other gallinaceous birds, ducks, geese, and the like). In some implementations, the subject may be a mammal. In other implementations, the subject may be a human.

The present disclosure provides a convenient, effective and stable delivery method for daily probiotics without the need to consume additional calories, flavoring compounds, preservatives, dairy, stabilizers, emulsifiers or other processing aids.

In one or more embodiments, contemplated in this disclosures is a probiotic composition comprising (a) a therapeutically effective amount of at least one viable probiotic microorganism having a biological or therapeutic activity in the gastrointestinal tract; and (b) a carrier suitable for human consumption. In these or other embodiments, the disclosure provides a probiotic beverage or drink that does not require refrigeration and is stable at room temperature for 6 months or more. In a preferred implementation, the delivery method is via bottled drinking water, which the average individual consumes about 500 mL per day.

According to some aspects, one or more embodiments contemplated and described herein are able to deliver effective, live probiotic cultures through clean, bottled water with no calories or processing aids and to store, deliver and consume that enhanced water at room temperatures. The individual would not have to consume an additional beverage for probiotic consuming which would contain additional daily calories, dairy and exposure to processing aids such as flavor compounds and preservatives.

In another implementation, the present disclosure provides a probiotic composition consisting of a probiotic culture such that the probiotic culture is soluble or suspendable in a liquid medium. The culture when present in a beverage such as drinking water may consist of about $0.5 \times 10^6$ colony forming units (cfu)/mL, about $1 \times 10^6$ cfu/mL, about $2 \times 10^6$ cfu/mL, about $3 \times 10^6$ cfu/mL, about $4 \times 10^6$ cfu/mL, about $5 \times 10^6$ cfu/mL, about $6 \times 10^6$ cfu/mL, about $7 \times 10^6$ cfu/mL, about $8 \times 10^6$ cfu/mL, about $9 \times 10^6$ cfu/mL, or about $1 \times 10^7$ cfu/mL. In a preferred implementation, the culture does not cause a flavor, odor or visual change to the liquid medium thus making it possible, for the first time, to formulate a zero calorie, unflavored, clear beverage with active probiotic cultures without the need for refrigeration.

In yet another implementation, the disclosure provides a food additive comprising: a therapeutically effective amount of at least one viable probiotic microorganism having a biological or therapeutic activity in the gastrointestinal tract; and (b) a carrier suitable for human consumption wherein the carrier is selected from the group consisting of Gum Acacia, ascorbyl palmitate, TWEEN® 80 (polyethylene glycol sorbitan monooleate), Span® 40 (sorbitan monopalmitate), anhydrous glucose, anhydrous dextrose, dextrose monohydrate, and combinations thereof. The food additive may be a powdered water enhancer that can be added to bottled water by the individual. The enhanced water does not require refrigeration and will not contain any flavor masking agents, sugars, artificial sweeteners or calories.

In another aspect, the disclosure provides methods of treating acute or chronic diarrhea and of improving immune function, digestive health, and/or intestinal flora by administering the probiotic compositions to a subject in need thereof.

In another implementation, the disclosure provides a method of producing probiotic drinking water comprising: (a) mixing spores from at least one viable probiotic microorganism having a biological or therapeutic activity in the gastrointestinal tract with a carrier suitable for human consumption, wherein the carrier is selected from the group consisting of Gum Acacia, ascorbyl palmitate, TWEEN® 80 (polyethylene glycol sorbitan monooleate), Span® 40 (sorbitan monopalmitate), and combinations thereof, (b) drying the mixture of the spores and the carrier to form a desiccated powder that is soluble in water; and (c) blending the desiccated powder with drinking water. In some implementations, step (c) may comprise: (i) performing an initial blend wherein the desiccated powder is mixed with about 1/100th of the total volume of drinking water; (ii) performing a pre-blend with the initial blend by mixing the initial blend with an additional volume of drinking water, wherein the sum of the additional volume of drinking water and the volume of the initial blend is about 1/10th the total volume of drinking water; and (iii) performing a final blend in a batch tank by adding a volume of water to the pre-blend until the total volume of drinking water is reached and mixing the final blend for about 10 minutes at about 1,500 rpm.

In another implementation, this disclosure provides a method of producing a probiotic drink. This method may comprise mixing cells of at least one viable probiotic microorganism having a biological or therapeutic activity in the gastrointestinal tract with a first volume of drinking water to form a first dilution; mixing the first dilution with a second volume of drinking water to form a second dilution, the second volume of drinking water being between about five and about fifteen times greater than the first volume of drinking water; and mixing the second dilution with a third volume of drinking water to form a third dilution having a concentration of the cells from at least one viable probiotic microorganism substantially equal to a predetermined concentration of probiotic microorganisms in the probiotic drink, wherein the third volume of drinking water is between about five and about fifteen times greater than the first volume of drinking water. Aspects of the method may further comprise mixing the cells from at least one viable probiotic microorganism having a biological or therapeutic activity in the gastrointestinal tract with a carrier suitable for human consumption before mixing the cells from the at least one viable probiotic microorganism with the first amount of drinking water. According to some aspects, the second volume of drinking water is between about eight and about ten times greater than the first volume of drinking water, and the third volume of drinking water is between about eight and about ten times greater than the second volume of drinking water. According to some aspects, the concentration of the cells in the third dilution is between about $3 \times 10^6$ CFU/mL and about $6 \times 10^6$ CFU/mL. In such methods, the cells of the at least one viable probiotic microorganism may comprise spores of *bacillus* or an encapsulated form of any other probiotic microorganism described herein or otherwise known in the art.

The probiotic compositions or drinks may contain a probiotic microorganism selected from *Lactobacillus* sp., *Bifidobacterium* sp., *Lactococcus* sp., *Propionibacterium* sp., *Bacillus* sp., *Enterococcus* sp., *Escherichia* sp., *Streptococcus* sp., *Pediococcus* sp., and *Saccharomyces* sp. In certain aspects, the probiotic microorganism is at least one of *Lactobacillus acidophilus, Lactobacillus rhamnosus, Lactobacillus fermentum, Lactobacillus casei, Lactobacillus bulgaricus, Lactobacillus gasseri, Lactobacillus helveticus, Lactobacillus johnsonii, Lactobacillus lactis, Lactobacillus plantarum, Lactobacillus reuteri, Lactobacillus salivarius, Lactobacillus paracasei, Bifidobacterium* sp., *Bifidobacterium longum, Bifidobacterium infantis, Bifidobacterium animalis, Bifidobacterium bifidum, Bifidobacterium adelocentis, Bifidobacterium lactis, Bacillus subtilis, Bacillus coagulans, Bacillus clausii, Bacillus lichenformis, Enterococcus faecalis, Enterococcus faecium, Lactococcus lactis, Streptococcus salivarius, Saccharomyces cerevisiae,* and *Saccharomyces boulardii*. According to some aspects, a probiotic microorganism utilized in the compositions and drinks contemplated herein may be in the form of spores or in a vegetative state. According to other aspects, the probiotic organism utilized in the compositions and drinks contemplated herein may comprise any of the above listed microorganisms in a microencapsulation.

The concentration of the probiotic microorganism in the composition or drink may be at least about $1 \times 10^9$ cfu/g, at least about $2 \times 10^9$ cfu/g, at least about $3 \times 10^9$ cfu/g, at least about $4 \times 10^9$ cfu/g, at least about $5 \times 10^9$ cfu/g, at least about $6 \times 10^9$ cfu/g, at least about $7 \times 10^9$ cfu/g, at least about $8 \times 10^9$ cfu/g, at least about $9 \times 10^9$ cfu/g, at least about $1 \times 10^{10}$ cfu/g, at least about $2 \times 10^{10}$ cfu/g, at least about $3 \times 10^{10}$ cfu/g, at least about $4 \times 10^{10}$ cfu/g, at least about $5 \times 10^{10}$ cfu/g, at least about $6 \times 10^{10}$ cfu/g, at least about $7 \times 10^{10}$ cfu/g, at least about $8 \times 10^{10}$ cfu/g, at least about $9 \times 10^{10}$ cfu/g, or at least about $1 \times 10^{11}$ cfu/g.

In one implementation, about $1 \times 10^{10}$ cfu of microorganism is present in each gram of bulk, dried raw powder where each gram contains about 60% or less of bacterial mass and about 40% carrier system. In other implementations, each gram contains about 70% or less of bacterial mass and about 30% carrier system, about 80% or less of bacterial mass and about 20% carrier system, about 90% or less of bacterial mass and about 10% carrier system, about 50% or less of bacterial mass and about 50% carrier system, about 40% or less of bacterial mass and about 60% carrier system, about 30% or less of bacterial mass and about 70% carrier system, about 20% or less of bacterial mass and about 80% carrier system, or about 10% or less of bacterial mass and about 90% carrier system.

The carrier in the composition may be any one of Gum Acacia, ascorbyl palmitate, TWEEN® 80 (polyethylene glycol sorbitan monooleate), Span® 40 (sorbitan monopalmitate), anhydrous glucose, anhydrous dextrose, dextrose monohydrate, or any combination thereof. The carrier or combination of carriers used may be tailored to the finished product. If it were a beverage with a low pH, the combination of carriers would be altered when compared to a beverage with a neutral pH. The pH, isoelectric point, and mixing temperature are each taken into consideration when determining the composition of the carrier system.

The present disclosure provides the ability to have a high concentration of live probiotic bacteria in soluble form that does not create an organoleptic impact on a liquid beverage. In certain aspects, the culture is virtually undetectable when added to drinking water and is then stable at room temperature in that medium.

The drinking water may be natural spring water, filtered water, unfiltered water, reverse osmosis (RO) water, well water, table water, mineral water, melt water, rain water, tap water, or medicinal water. In certain implementations, the probiotic compositions comprising the drinking water are non-caloric.

Presently there are no other bacterial cultures that have been formulated into plain liquid that are both undetectable to human sense and stable at room temperatures. Current high concentration (500 million cfu/serving or more) probiotic cultures create a highly unfavorable taste, odor, and visual impact on any clear liquid and are not stable at room temperature. Thus, current probiotic beverages have to be sweetened, flavored, infused with processing aids, stabilizers, preservatives, etc. to mask the foul taste and odor from the culture. In addition, they have to be stored, shipped and delivered at refrigerated temperatures thus increasing their cost and creating inconvenience. The present disclosure addresses these problems and provides a convenient, effective and stable delivery method for daily probiotics without the need to consume additional calories, flavoring compounds, preservatives, dairy, stabilizers, emulsifiers or other processing aids According to some aspects of the embodiments described herein, a probiotic drink or composition comprises a probiotic culture such that the probiotic culture is soluble or suspendable in a liquid medium where the culture consists of 500 million cfu/serving or greater where the culture does not cause a flavor, odor or visual change to the liquid medium. Thus, for the first time, a zero calorie, unflavored, clear beverage with active probiotic cultures without the need for refrigeration is provided.

The present disclosure provides one or more of the following advantages to consumers: First, the ability to consume effective doses of daily probiotics with the water each individual consumes on a daily basis, thus eliminating the need to consume an additional beverage that also contains calories, sugar and other undesired components. Caloric beverages often account for a significant portion of the extra calories consumed by individuals that lead to weight gain. Second, the ability to store, ship and consume the beverage at room temperature thus keeping the cost under better control and adding to the convenience of use. The present disclosure provides for probiotic compositions and drinking water with significant room temperature stability allowing for the consuming of the product over several hours or even days. Other probiotic beverages have to be consumed within a few hours or they have to be kept in the refrigerator. Third, a significant cost savings over other probiotic beverages. Consumers on average consume 1 L of water (typically bottled) per day as water is a vital nutrient. Currently, when seeking a probiotic beverage, a consumer has to purchase an additional beverage aside from the water already purchased to meet a therapeutic need. A typical bottle of water at 1 liter costs about $2.40. The typical probiotic beverage costs about $3.69/bottle. Total cost in use for 1 L of water+current probiotic beverage would be about $6.09 for the 2 bottles. The probiotic drinking water of the present disclosure satisfies 100% RDA for the probiotic strain and covers the 1 L of water consumed by an average person each day—the 2 bottles of the present invention would cost about $3.98. This is a daily cost savings of about $2.11 or nearly $800 per year per person. And fourth, the ability to deliver live probiotic cultures in plain water with no flavor expands the use and marketability of the product to a wider audience. Dairy based beverages are not consumable by those with lactose or dairy intolerance. Juice or ferment based beverages have very subjective tastes and are not widely accepted. However, everybody drinks water; it is universal, and it expands the ability to deliver beneficial probiotics to a much larger consumer base. This is especially true for children.

Micro-Encapsulation

In certain implementations, the probiotic microorganisms are microencapsulated prior to addition to the probiotic compositions. Micro-encapsulation is a process in which tiny particles or droplets are surrounded by a coating to give small capsules of many useful properties. In a relatively simple form, a microcapsule is a small sphere with a uniform wall around it. The material inside the microcapsule is referred to as the core, internal phase, or fill, whereas the wall is sometimes called a shell, coating, or membrane. Most microcapsules have diameters between a few micrometers and a few millimeters.

The definition has been expanded, and includes most foods. Every class of food ingredient has been encapsulated; flavors are the most common. The technique of microencapsulation depends on the physical and chemical properties of the material to be encapsulated. See Jackson L. S.; Lee K. (1991 Jan. 1). "Microencapsulation and the food industry". Lebensmittel—Wissenschaft Technologie.

Many microcapsules however bear little resemblance to these simple spheres. The core may be a crystal, a jagged adsorbent particle, an emulsion, a Pickering emulsion, a suspension of solids, or a suspension of smaller microcapsules. The microcapsule even may have multiple walls.

Various techniques may be used to produce microcapsules. These include pan coating, air-suspension coating, centrifugal extrusion, vibrational nozzle, spray-drying, ionotropic gelation, interfacial polycondensation, interfacial cross-linking, in situ polymerization, and matrix polymerization as described below.

Pan Coating

The pan coating process, widely used in the pharmaceutical industry, is among the oldest industrial procedures for forming small, coated particles or tablets. The particles are tumbled in a pan or other device while the coating material is applied slowly.

Air-Suspension Coating

Air-suspension coating, first described by Professor Dale Eavin. Wurster at the University of Wisconsin in 1959, gives improved control and flexibility compared to pan coating. In this process the particulate core material, which is solid, is dispersed into the supporting air stream and these suspended particles are coated with polymers in a volatile solvent leaving a very thin layer of polymer on them. This process is repeated several hundred times until the required parameters such as coating thickness, etc., are achieved. The air stream which supports the particles also helps to dry them, and the rate of drying is directly proportional to the temperature of the air stream which can be modified to further affect the properties of the coating.

The re-circulation of the particles in the coating zone portion is effected by the design of the chamber and its operating parameters. The coating chamber is arranged such that the particles pass upwards through the coating zone, then disperse into slower moving air and sink back to the base of the coating chamber, making repeated passes through the coating zone until the desired thickness of coating is achieved.

Centrifugal Extrusion

Liquids are encapsulated using a rotating extrusion head containing concentric nozzles. In this process, a jet of core liquid is surrounded by a sheath of wall solution or melt. As the jet moves through the air it breaks, owing to Rayleigh instability, into droplets of core, each coated with the wall solution. While the droplets are in flight, a molten wall may be hardened or a solvent may be evaporated from the wall solution. Since most of the droplets are within ±10% of the mean diameter, they land in a narrow ring around the spray nozzle. Hence, if needed, the capsules can be hardened after formation by catching them in a ring-shaped hardening bath. This process is excellent for forming particles 400-2,000 µm in diameter. Since the drops are formed by the breakup of a liquid jet, the process is only suitable for liquid or slurry. A high production rate can be achieved, i.e., up to 22.5 kg (50 lb) of microcapsules can be produced per nozzle per hour per head. Heads containing 16 nozzles are available.

Vibrational Nozzle

Core-Shell encapsulation or Microgranulation (matrix-encapsulation) can be done using a laminar flow through a nozzle and an additional vibration of the nozzle or the liquid. The vibration has to be done in resonance of the Rayleigh instability and leads to very uniform droplets. The liquid can consists of any liquids with limited viscosities (0-10,000 mPa s have been shown to work), e.g. solutions, emulsions, suspensions, melts etc. The solidification can be done according to the used gelation system with an internal gelation (e.g. sol-gel processing, melt) or an external (additional binder system, e.g. in a slurry). The process works very well for generating droplets between 20-10,000 µm, applications for smaller and larger droplets are known. The units are deployed in industries and research mostly with capacities of 1-20,000 kg per hour (2-44,000 lb/h) at working temperatures of 20-1500° C. (68-2732° F.) (room temperature up to molten silicon). Nozzles heads are available from one up to several hundred thousand are available.

Spray-Drying

Spray drying serves as a microencapsulation technique when an active material is dissolved or suspended in a melt or polymer solution and becomes trapped in the dried particle. The main advantages are the ability to handle labile materials because of the short contact time in the dryer, in addition, the operation is economical. In modern spray dryers the viscosity of the solutions to be sprayed can be as high as 300 mPa s. Applying This technique along with the use of supercritical Carbon Dioxide, also sensitive materials like proteins can be encapsulated.

Ionotropic Gelation

The coacervation-phase separation process consists of three steps carried out under continuous agitation:
1. Formation of 3 immiscible chemical phases: liquid manufacturing vehicle phase, core material phase and coating material phase.
2. Deposition of coating: core material is dispersed in the coating polymer solution. Coating polymer material coated around core. Deposition of liquid polymer coating around core by polymer adsorbed at the interface formed between core material and vehicle phase.
3. Rigidization of coating: coating material is immisible in vehicle phase and it gets rigid form. It done by thermal, cross-linking, or dissolvation techniques.

Interfacial Polycondensation

In Interfacial polycondensation, the two reactants in a polycondensation meet at an interface and react rapidly. The basis of this method is the classical Schotten-Baumann reaction between an acid chloride and a compound containing an active hydrogen atom, such as an amine or alcohol, polyesters, polyurea, polyurethane. Under the right conditions, thin flexible walls form rapidly at the interface. A solution of the pesticide and a diacid chloride are emulsified in water and an aqueous solution containing an amine and a polyfunctional isocyanate is added. Base is present to neutralize the acid formed during the reaction. Condensed polymer walls form instantaneously at the interface of the emulsion droplets.

Interfacial Cross-Linking

Interfacial cross-linking is derived from interfacial polycondensation, and was developed to avoid the use of toxic diamines, for pharmaceutical or cosmetic applications. In this method, the small bifunctional monomer containing active hydrogen atoms is replaced by a biosourced polymer, like a protein. When the reaction is performed at the interface of an emulsion, the acid chloride reacts with the various functional groups of the protein, leading to the formation of a membrane. The method is very versatile, and the properties of the microcapsules (size, porosity, degradability, mechanical resistance). [4] Flow of artificial microcapsules in microfluidic channels:

In-Situ Polymerization

In a few microencapsulation processes, the direct polymerization of a single monomer is carried out on the particle surface. In one process, e.g. Cellulose fibers are encapsulated in polyethylene while immersed in dry toluene. Usual deposition rates are about 0.5 µm/min. Coating thickness ranges 0.2-75 µm (0.0079-3.0 mils). The coating is uniform, even over sharp projections. Protein microcapsules are biocompatible and biodegradable, and the presence of the protein backbone renders the membrane more resistant and elastic than those obtained by interfacial polycondensation.

Matrix Polymerization

In a number of processes, a core material is imbedded in a polymeric matrix during formation of the particles. A simple method of this type is spray-drying, in which the particle is formed by evaporation of the solvent from the matrix material. However, the solidification of the matrix also can be caused by a chemical change.

Various embodiments of the contemplated disclosures are further illustrated by the following additional examples that should not be construed as limiting. Those of skill in the art should, in light of the present disclosure, appreciate that many changes can be made to the specific embodiments which are disclosed and still obtain a like or similar result without departing from the spirit and scope of the invention.

EXAMPLES

Example 1. Procedure for Adding the Probiotic Microbial Strain to Drinking Water The procedure for adding the probiotic to the water is as follows. The process is done as a batching process. Filtered or other drinking water is batched into tanks that preferably have the capability to mix at a moderate speed (e.g. about 1500 rpm). The probiotic microbial strain, preferably in the form of spores, is added using a geometric addition system with two steps of 10 fold dilution. If 500 g were to be added in total to a 1,000-gallon batch, the 500 g would first be added and mixed into a 10-gallon pre-mix batch. Then, the 10-gallon pre-mix batch would be added to a 100-gallon secondary mix batch and mixed for 5-7 minutes. The 100-gallon secondary mix would finally be added to the 1,000-gallon batch tank and mixed for 5-7 minutes.

Example 2. Stability of Bacillus Spores in Formulated Drinking Water

Bacillus spores were combined with a mixture of carriers consisting of a combination of Gum Acacia, ascorbyl palmitate, TWEEN® 80 (polyethylene glycol sorbitan monooleate), and Span® 40 (sorbitan monopalmitate) and then added to filtered drinking water using the procedure outlined in Example 1. The stability and viability of the Bacillus spores was tested over a 6-month period.

The conditions for storage of the product were room temperature with high relative humidity. The initial inoculum level was maintained within less than a 1 log variation and typically within the minimum detection level for the plating method (see FIG. 1). This study demonstrated the effectiveness of the formulation at preserving the spores in drinking water without the need of flavoring agents and without causing any odor in the drinking water.

Example 3. Serial Dilution of Bacillus atrophaeus (Bacillus subtilis) Spores in Probiotic Drink Methodology Bacillus subtilis HU58 powder $1 \times 10^{11}$ (a spores suspension—American Type Culture Collection #9372) was diluted in spring water to a concentration of approximately $4 \times 10^6$ as described in greater detail in the steps below. The addition of the probiotic spores to the water was done in an increasing serial concentration method to ensure proper distribution and suspension of the strains in the final volume of desired concentration.

Serial concentration to achieve a desired concentration of one embodiment of a probiotic drink including the following steps.
1. 160 mg of powder ($1.6 \times 10^{10}$) was added to 40 mL (approximately 0.0105 gal) of spring water and mixed for 5 to 7 minutes. The resulting concentration was expected to be approximately $4 \times 10^8$ CFU/mL.
2. The entire contents of the solution from step (1.) was added to 360 mL (approx. 0.105) gal) of spring water and mixed for 5 to 7 minutes. The resulting concentration was expected to be approximately $4 \times 10^7$ CFU/mL.
3. The entire contents of the solution from step (2.) was added to 3385 mL (total volume should be 1 gallon) of spring water and mixed for 5 to 7 minutes. The resulting concentration was expected to be approximately $4 \times 10^6$ CFU/mL.

Mixing of this non-limiting embodiment was performed on a reciprocating shaker (200 rpm) at 37 degrees Celsius. To confirm that the HU58 powder was diluted to $4 \times 10^6$ CFU/mL, 1.0 mL from the above flask was transferred to 9 mL of saline. The resulting concentration was approximately $4 \times 10^5$ CFU/mL. Four additional 1:10 serial dilutions were performed to obtain concentrations of $4 \times 10^4$, $4 \times 10^3$, $4 \times 10^2$ and $4 \times 10^1$ to CFU/mL. Surface streaking 0.1 mL of the last 3 dilutions ($10^3$, $10^2$ and $10^1$) in duplicate on sterile SBCD agar plates using a sterile spreader was performed, and all plates were incubated at 37° C. for 48 hours. The plates were removed from the incubator and the number of colony forming units on each plate was counted and recorded. 1 mL of the spring water was also plated in duplicate to confirm that it is free of microorganisms.

Validation using Bacillus subtillis ATCC #9732 was performed. 1 mL of Bacillus subtillis spore suspension was added to 99 mL of saline plus 0.5% TWEEN® 80 (This is a $10^2$ dilution). This was kept on a rotary shaker (200 rpm) at 37 degrees Celsius for 30 minutes. 1.0 mL from the above flask was transferred to 9 mL of saline, and serial dilution of Bacillus subtillis was carried out as described above. 0.1 mL of the last 3 dilutions ($10^4$, $10^5$ and $10^6$) was surface streaked in duplicate on sterile SBCD agar plates using a sterile spreader. The plates were incubated at 37 degrees Celsius for 48 hours. The plates were removed from the incubator and the number of colony forming units on each plate was counted and recorded.

Calculations took the average of the duplicate plates and multiplied by the dilution factor×the volume of sample used. $25 \times 10^6 \times 1$ mL=$2.5 \times 10^6$ CFU per gram or mL. The validation was considered successful if the CFU recovered using the above media was within 50% to 150% of the amount listed on the spore suspension specification.

Results Recovery and Plating Protocol

The spring water background count was found to be 18 CFU/mL. Table 1 provides a comparison between the recovered and expected CFU/mL for the two samples.

TABLE 1

| Sample | Recovered CFU/ML | Expected CFU/ML | Percent Recovery (50-150%) |
|---|---|---|---|
| Bacillus subtilis HU58 in 1 gallon spring water | $5.4 \times 10^6$ | $4.0 \times 10^6$ | 135% |
| Bacillus atrophaeus spore suspension | $1.3 \times 10^8$ | $1.2 \times 10^8$ | 108% |

Conclusion: The data indicates that the procedure for recovering the stable probiotic from spring water is valid as it meets the test criteria of recovery within 50-150% of the initial, known concentration.

Example 4. Shelf-Life Stability of *Bacillus atrophaeus* (*Bacillus subtilis*) Spores in Probiotic Drink Methodology One gallon of total probiotic water mixture was distributed in 100 mL aliquots. The 100 mL containers were PET plastic containers with a screw top closure to mimic a standard plastic bottled water container. The room temperature stability testing was accelerated by storing the 100 mL samples at 45 degrees Celsius in an incubator at 75% Relative Humidity. The 1 gallon batch of probiotic infused water was prepared by the following sequence:

4. 160 mg of powder ($1.6 \times 10^{10}$) and was added to 40 mL (approx 0.0105 gal) of spring water and mixed for 5 to 7 minutes. The resulting concentration was expected to be approximately $4 \times 10^8$ CFU/mL.
5. The entire contents of the solution of (1.) were added to 360 mL (approximately 0.105 gal) of spring water and mixed for 5 to 7 minutes. The resulting concentration was expected to be approximately $4 \times 10^7$ CFU/mL.
6. The entire contents of the solution of (2.) were added to 3385 mL (total volume expected to be 1 gallon) of spring water and mixed for 5 to 7 minutes. The resulting concentration was expected to be approximately $4 \times 10^6$ CFU/mL.

Samples were pulled at 30-day intervals for plating, and samples were pulled in triplicate for plating. The data represents the average count of the 3 samples per time point.

Results—Shelf Life Stability Data

Table 2 provides the concentration of the stable probiotic drink per 30-day time interval under the accelerated conditions described above.

TABLE 2

| TIME | PROBIOTIC CONCENTRATION PER ML |
|---|---|
| 0-Day 1 | $5.3 \times 10^5$ cfu/mL |
| 30 days | $4.1 \times 10^5$ cfu/mL |
| 60 days | $8.7 \times 10^5$ cfu/mL |
| 90 days | $4.0 \times 10^5$ dfu/mL |

Figure 2:
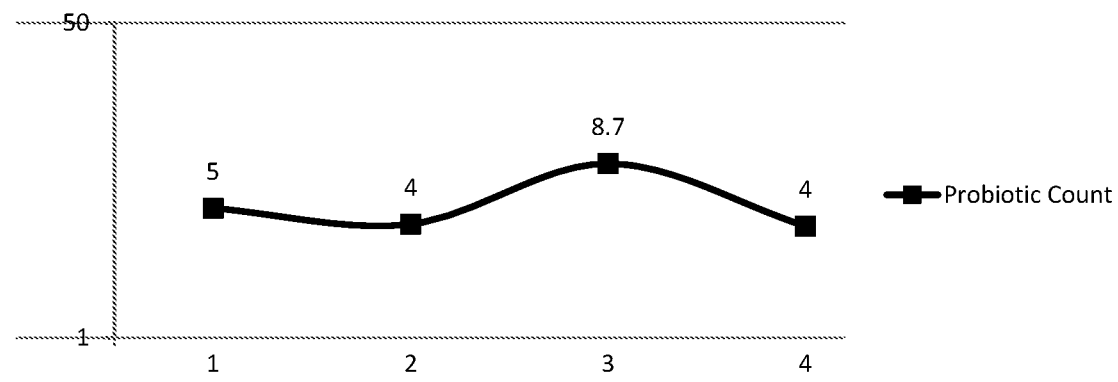
FIG. 2 depicts a graph illustrating the stability over time of a probiotic culture under accelerated conditions.

FIG. 2 is a graph illustrating the stability over time of the probiotic culture under accelerated conditions. The 90 days of real-time data under accelerated conditions corresponds to 6-9 months of shelf life at room temperatures and ambient relative humidity. As demonstrated in FIG. 2, after 90 days of accelerated stability testing, the probiotic demonstrated stability in natural, spring water. The variations from test date to test date are well within the accepted fluctuations. It has been determined, therefore, that the probiotic water is shelf stable.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein. All publications, patents, and patent publications cited are incorporated by reference herein in their entirety for all purposes.

The publications discussed herein are provided solely for their disclosure prior to the filing date of the present application. Nothing herein is to be construed as an admission that the present invention is not entitled to antedate such publication by virtue of prior invention.

It is understood that the disclosed invention is not limited to the particular methodology, protocols and materials described as these can vary. It is also understood that the terminology used herein is for the purposes of describing particular embodiments only and is not intended to limit the scope of the present invention which will be limited only by the appended claims.

Those skilled in the art will recognize, or be able to ascertain using no more than routine experimentation, many equivalents to the specific embodiments of the invention described herein. Such equivalents are intended to be encompassed by the following claims.

The invention claimed is:

1. A probiotic drink, comprising at least one viable probiotic microorganism and water, wherein the at least one probiotic microorganism comprises one or more of microencapsulated viable probiotic microorganisms and spores of *Bacillus* sp. without causing a change of flavor, odor or appearance of the water wherein the probiotic drink is devoid of flavor masking agents, sugars, calories and artificial sweeteners and wherein the probiotic drink maintains a probiotic count within one log variation from an initial inoculum level while stored in the water for at least six months without refrigeration.

2. The probiotic drink of claim 1, further comprising a carrier suitable for human consumption.

3. The probiotic drink of claim 2, wherein the at least one viable probiotic microorganism comprises microencapsulated viable probiotic organisms selected from the group consisting of *Lactobacillus* sp., *Bifidobacterium* sp., *Lactococcus* sp., *Propionibacterium* sp., *Bacillus* sp., *Enterococcus* sp., *Escherichia* sp., *Streptococcus* sp., *Pediococcus* sp., and *Saccharomyces* sp.

4. The probiotic drink of claim 2, wherein the at least one viable probiotic microorganism comprises the spores of *Bacillus* sp.

5. The probiotic drink of claim 4, wherein concentration of the spores of *Bacillus* sp. is between about $3 \times 10^6$ CFU/mL and about $7 \times 10^6$ CFU/mL of the probiotic drink.

6. The probiotic drink of claim 2, further comprising electrolytes and wherein the carrier is selected from the group consisting of Gum Acacia, ascorbyl palmitate, polyethylene glycol sorbitan monooleate, sorbitan monopalmitate, anhydrous glucose, anhydrous dextrose, dextrose monohydrate, and combinations thereof.

7. A probiotic composition for use as a food or drink additive, comprising:
   a therapeutically effective amount of spores of *Bacillus* sp.; and
   a carrier suitable for human consumption, the carrier being selected from the group consisting of Gum Acacia, ascorbyl palmitate, polyethylene glycol sorbitan monooleate, sorbitan monopalmitate, anhydrous glucose, anhydrous dextrose, dextrose monohydrate, and combinations thereof, wherein the probiotic composition is devoid of flavor masking agents, sugars, calories and artificial sweeteners and wherein the probiotic drink maintains a probiotic count within one log variation from an initial inoculum level for at least six months when stored in the carrier without refrigeration.

8. The probiotic composition of claim 7, wherein the carrier is a combination of Gum Acacia, ascorbyl palmitate, polyethylene glycol sorbitan monooleate, and sorbitan monopalmitate.

9. The probiotic composition of claim 7, wherein the spores of *Bacillus* sp. are selected from the group consisting of *Bacillus subtilis, Bacillus coagulans*, and *Bacillus licheniformis*.

10. The probiotic composition of claim 7, further comprising electrolytes.

\* \* \* \* \*